United States Patent Office 3,059,013
Patented Oct. 16, 1962

3,059,013
ORGANIC MERCURIAL COMPOUNDS USEFUL AS GERMICIDES, BACTERICIDES AND FUNGICIDES
David M. Musser, Fairlawn, N.J., assignor to Chicopee Manufacturing Corporation, New Brunswick, N.J., a corporation of Massachusetts
No Drawing. Filed Nov. 24, 1959, Ser. No. 855,031
8 Claims. (Cl. 260—431)

This invention relates to a new compound and compositions made therefrom useful as germicides, bactericides and fungicides in treating such materials as textiles, paper, leather, rubber, and in plastic coating compositions, soaps, cosmetics, agricultural sprays, and the like, to render said materials bacteriostatic and fungistatic.

Germicides for use on materials such as textiles, paper, leather, rubber and the like must be characterized by a number of essential properties, the combination of which in a single chemical compound is difficult to attain. The most essential requisite is that the germicide should have a high toxicity to fungi and bacteria in very dilute solution so that the maximum protection will be obtained with a minimum quantity of material. Consequently, it is essential that a germicide for treating such material should be soluble in a common, inexpensive, readily available solvent, preferably water. Another essential characteristic for germicides for such materials is that they must be non-irritating to the human skin when used in wearing apparel or in cosmetics. Other desirable characteristics in germicides for such materials is that they should not substantially discolor the treated materials. They should be stable upon a long exposure to sunlight and should not chemically react with the treated materials in an adverse manner. Finally, the germicide should exhibit a substantial laundry fastness. The combination of all these properties in a single chemical compound is obviously difficult of attainment.

It is well known that aromatic mercury compounds are good bacteriostatic and fungistatic compounds. I have previously developed a germicidal composition containing a phenyl mercury compound which is disclosed in U.S. Patent 2,867,563. While this composition exhibited satisfactory germicidal properties, it has not been found to be satisfactory from other standpoints. I have found that the phenyl mercury compounds are sensitive to light and discolor when exposed to light. Moreover, the compounds, while stable in storage, were not too stable on application and formed free mercury deposits on the material being treated and became discolored.

These defects make the phenyl mercury compounds generally unsatisfactory for use in treating light colored materials such as white or light colored textile fabrics, papers, leathers, etc., or any application where the germicidal agent is to be applied to light colored materials where the final appearance is important.

It is therefore an object of my invention to provide a novel organic mercury compound having germicidal, bactericidal and fungicidal activity and which has greater stability on application to textiles, paper, leather etc.

It is a further object to provide a water soluble organic mercury compound which may be used in aqueous solution for treating textile fabrics, paper, leather and the like, and as an agricultural spray.

Another object is to provide a composition containing an organic mercury compound which is light stable and does not darken upon exposure to light.

These and other objects of my invention will become apparent as the description thereof proceeds.

I have discovered a new organic mercury compound which is effective for obtaining the results described above. My new compound is produced by a reaction between a hydroxy alkanoic acid which is either lactic acid or hydroxy acetic acid, a lower alkylol amine, and yellow mercuric oxide. The product is thus the mercuric salt of the ester of the alkylol amine with the hydroxy alkanoic acid and is water white, water soluble and stable on storage.

As hydroxy substituted carboxylic acids, I use lactic or hydroxy acetic acids. A large number of alkylol amines are suitable, such as amino substituted alcohols, for example 2-amino-2-methyl-1-propanol; 2-amino-1-butanol; 2-amino-2-ethyl-1,3-propanediol; 2-amino-2-methyl - 1,3-propanediol; tris (hydroxymethyl) aminoethane; 1-amino ethanol; 2-amino ethanol; 2-butylamino ethanol; 2-diethylamino ethanol; 2-dimethylamino ethanol; 2-ethylamino ethanol; 2-isobutylamino ethanol; 2-methylamino ethanol; and mono-, di-, and triethanol amines.

The compound may be produced by dissolving the hydroxy alkanoic acid in water, and thereafter stirring in the alkylol amine followed by the yellow mercuric oxide. The quantity of acid (50%) used is from about 17 to 21 parts per 75 parts of water. The alkylol amine is added in the amount of about 1.6 to 2 parts and the quantity of mercuric oxide is 3.5 to 4.3 parts.

Thus, for example, mercuric-2-amino-2-methyl-1-propanol lactate may be produced by reacting lactic acid, 2-amino-2-methyl-1-propanol and yellow mercuric oxide.

The new germicide of the invention may be used for coating, impregnating or finishing various materials, especially textile, paper, leather, foils and articles formed from these materials, such for example, as garments, bandages, surgical dressing, tent cloth, uniforms, corsets, girdles, upholstery material dress shields, and many other articles. The germicide of the invention may be dissolved in water, and applied to material to be treated by spraying, padding, dipping, back-filling, or by any other suitable method. In the case of non-fibrous foils, the material may be incorporated in the plastic mass and the plastic material extruded in the form of filaments, fabrics, bristles, films, foils, tubing and the like.

The mercury compound of this invention is preferably used in an aqueous solution since it may readily be applied in this form. The quantity of the compound used in the solution should be sufficient to provide at least 0.01 percent dry add on but usually not greater than 1 percent dry add on of solids to the materials treated. The use of a greater quantity may create danger of skin irritation when treating fabrics, or other materials, which come into contact with the skin. More than 1 percent may be used, however, where the treated material will not contact the skin. A preferred range is between 0.2 to 0.5 percent add on of solids by weight of the treated material.

The following examples are set forth to illustrate the method for producing my compound and the use of the compound. It will be understood, however, that the invention is not intended to be limited to the exact conditions recited in the examples.

EXAMPLE I 19.3 parts of lactic acid (50%) was dissolved in 75 parts of water. To this solution was added, with stirring, 1.8 parts of 2-amino-2-methyl-1-propanol, followed by 3.9 parts of yellow mercuric oxide. Stirring was continued without the application of external heat until solution was complete. The solution produced was water white and dissolved in water. The solution was exposed to sunlight with no resultant discoloration.

EXAMPLE II

In order to demonstrate the germicidal effectiveness of the inventive compound, a cotton textile fabric was treated with the compound produced in Example I. Three separate samples of fabric, samples A, B and C, were treated with aqueous solutions of different concentrations of the mercuric-2-amino-2-methyl-1-propanol lactate. For each sample, the diluted solution was padded onto the cotton cloth to provide 100 percent increase in weight and the cloth was then dried. For sample A, the concentration of the solution was such as to leave 0.1 percent add on of solids to the fabric; for sample B, 0.5 percent add on; and for sample C, 1.0 percent add on.

The above samples were then submitted to bacteriostatic tests. The tests were conducted by the Agar Plate Method, using 0.1 cc. of 24 hour culture of standard strain of *Micrococcus pyogenes* var. *aureus* (*Staphylococcus aureus*) and Standard F.D.A. agar; incubated at 37° C. for 24 hours. The following table illustrates the results of the bacteriostatic tests.

*Table I*

| Sample | Concentration, percent | Result | Halo, mm. |
|---|---|---|---|
| A | 0.1 | No growth in the contact area | 0.5 |
| B | 0.5 | ---- do ---- | 3.9 |
| C | 1.0 | ---- do ---- | 6.0 |

All three results are rated excellent bacteriostatically.

EXAMPLE III 12.0 parts of hydroxyacetic acid (70%) was dissolved in 82.3 parts of water. To this solution were added, with stirring, 1.8 parts of 2-amino-2-methyl-1-propanol and 3.9 parts of yellow mercuric oxide. Stirring was continued without the application of external heat until solution was complete. The solution produced deposited no mercury on storage at room conditions.

EXAMPLE IV 2.0 parts of triethanolamine was dissolved in 82.3 parts of water. To this solution was added 3.9 parts of yellow mercuric oxide. With stirring and without external heat, 12.0 parts of hydroxyacetic acid (70%) was gradually added. A clear solution was obtained which showed no deposition of mercury on storage at room temperature. Similar results were observed when diethanolamine or monoethanolamine was used in place of the triethanolamine.

EXAMPLE V

A clear solution was obtained by introducing into 82.3 parts of water 1.8 parts of 2-amino-2-methyl-1,3-propanediol, 12.0 parts of lactic acid (70%) and 3.9 parts of yellow mercuric oxide, and stirring until solution was complete. The solution obtained was stable on storage at room temperature.

While I have set forth specific embodiments and preferred modes of operation of my invention, it will be understood that I do not intend to be limited thereby and that various changes and modifications may be made without departing from the spirit of the disclosure and the scope of the appended claims.

When compositions embodying my invention are used as agricultural sprays, seed disinfectants, and for treatment of fruit trees, shade trees, lawns, turf or living vegetable matter to inhibit the growth of bacteria or fungi thereon, the solution may be sprayed directly on the living vegetable matter. The concentration of the organic mercury compound in the spray so used should be relatively low and insufficient to result in injury to the living vegetable matter treated. In general the amount of the organic mercury compound present in the spray should equal from about 0.001 to 0.1% by weight of the spray.

The solutions described in the foregoing examples may further be used in agricultural sprays, for use in the paper making industry and elsewhere to inhibit the growth of fungi and have many other commercial applications wherein it is desired to provide a relatively high concentration of an organic mercury compound in aqueous solution. In view thereof, it should be understood that the composition and methods of using products embodying my invention and the concentration of the fungicidal agent in any particular solution may be varied considerably without departing from the spirit and scope of my invention as defined by the following claims.

I claim:

1. The compound produced by reacting an aqueous hydroxy alkanoic acid selected from the group consisting of lactic and hydroxy acetic acids, and a lower alkylol amine, and adding yellow mercuric oxide to the reaction mixture.

2. The compound defined in claim 1 wherein the alkylol amine is 2-amino-2-methyl-1-propanol.

3. The compound defined in claim 1 wherein the alkylol amine is triethanolamine.

4. The compound defined in claim 1 wherein the alkylol amine is diethanolamine.

5. The compound defined in claim 1 wherein the alkylol amine is monoethanolamine.

6. The compound defined in claim 1 wherein the alkylol amine is 2-amino-2-methyl-1,3-propanediol.

7. The compound defined in claim 1 wherein the hydroxy alkanoic acid is lactic acid.

8. The compound defined in claim 1 wherein the hydroxy alkanoic acid is hydroxy acetic acid.

References Cited in the file of this patent

UNITED STATES PATENTS

| 1,824,428 | Fisher | Sept. 22, 1931 |
| 2,103,153 | Dunham | Dec. 21, 1937 |
| 2,119,701 | Callsen | June 7, 1938 |
| 2,156,598 | Miescher | May 2, 1939 |
| 2,726,189 | Cook | Dec. 6, 1955 |
| 2,877,251 | Fox | Mar. 10, 1959 |